(12) United States Patent
Keller (10) Patent No.: US 7,516,170 B2
(45) Date of Patent: Apr. 7, 2009

(54) COMPUTER GRAPHICS SYSTEMS AND METHODS USING STRATIFICATION BY RANK-1 LATTICES

(75) Inventor: Alexander Keller, Ulm (DE)

(73) Assignee: Mental Images GmbH, Berlin (DE)

( * ) Notice: Subject to any disclaimer, the term of this patent is extended or adjusted under 35 U.S.C. 154(b) by 0 days.

(21) Appl. No.: 11/688,698

(22) Filed: Mar. 20, 2007

(65) Prior Publication Data

US 2007/0271322 A1 Nov. 22, 2007

Related U.S. Application Data

(63) Continuation of application No. 10/439,311, filed on May 15, 2003, now abandoned.

(60) Provisional application No. 60/378,115, filed on May 15, 2002.

(51) Int. Cl.
*G06F 17/10* (2006.01)
(52) U.S. Cl. ..................................... 708/444
(58) Field of Classification Search .................. 708/444
See application file for complete search history.

(56) References Cited

U.S. PATENT DOCUMENTS

| 6,911,976 | B2 * | 6/2005 | Abramov | 345/426 |
| 2003/0063082 | A1 * | 4/2003 | Abramov | 345/418 |
| 2005/0264564 | A1 * | 12/2005 | Keller | 345/421 |
| 2005/0264565 | A1 * | 12/2005 | Keller | 345/421 |
| 2005/0264568 | A1 * | 12/2005 | Keller | 345/426 |
| 2005/0275652 | A1 * | 12/2005 | Keller | 345/419 |
| 2005/0275660 | A1 * | 12/2005 | Keller | 345/613 |
| 2005/0275663 | A1 * | 12/2005 | Kokojima et al. | 345/622 |

* cited by examiner

*Primary Examiner*—David H Malzahn
(74) *Attorney, Agent, or Firm*—Jacobs & Kim LLP; David Jacobs (57) ABSTRACT

A computer program product for a computer graphics system comprises computer executable instructions recorded on a computer-readable medium: instructions executable to enable the computer to generate a selected number of sample points over an integration domain, such that there is at least one sample point in each of a plurality of strata distributed over the domain, the strata being defined by a rank-1 lattice; instructions executable to enable the computer to, for respective ones of the sample points, generate a value for the function at the respective sample point; and instructions executable to enable the computer to use the generated function values in generating an estimate for the value of the integral in relation to at least one object and at least one light source in a scene, the estimate corresponding to a pixel value for the image, to enable the computer to generate a display-controlling electrical output.

23 Claims, 2 Drawing Sheets

| $n = F_k$ | g | $j_1$ | $j_2$ |
|---|---|---|---|
| $2 = F_3$ | (1,1) | $F_1 = 1$ | $F_2 = 1$ |
| $3 = F_4$ | (1,2) | $F_1 = 1$ | $F_2 = 1$ |
| $5 = F_5$ | (1,3) | $F_3 = 2$ | $F_2 = 1$ |
| $8 = F_6$ | (1,5) | $F_3 = 2$ | $F_2 = 1$ |
| $13 = F_7$ | (1,8) | $F_3 = 2$ | $F_4 = 3$ |
| $21 = F_8$ | (1,13) | $F_3 = 2$ | $F_4 = 3$ |
| $34 = F_9$ | (1,21) | $F_5 = 5$ | $F_4 = 3$ |
| $55 = F_{10}$ | (1,34) | $F_5 = 5$ | $F_4 = 3$ |
| $89 = F_{11}$ | (1,55) | $F_5 = 5$ | $F_6 = 8$ |
| $144 = F_{12}$ | (1,89) | $F_5 = 5$ | $F_6 = 8$ |
| $233 = F_{13}$ | (1,144) | $F_7 = 13$ | $F_6 = 8$ |
| $377 = F_{14}$ | (1,233) | $F_7 = 13$ | $F_6 = 8$ |
| $610 = F_{15}$ | (1,377) | $F_7 = 13$ | $F_8 = 21$ |
| $987 = F_{16}$ | (1,610) | $F_7 = 13$ | $F_8 = 21$ | ns
COMPUTER GRAPHICS SYSTEMS AND METHODS USING STRATIFICATION BY RANK-1 LATTICES

INCORPORATION BY REFERENCE

This application is a Continuation of application Ser. No. 10/439311 filed May 15, 2003 (abandoned) which claims priority benefit from provisional 60/378115 filed May 15, 2002 (expired), each being incorporated herein by reference, as is application Ser. No. 08/880,418 filed Jun. 23, 1997 (issued as U.S. Pat. No. 6,529,193) (hereinafter "the Grabenstein application").

FIELD OF THE INVENTION

The invention related to computer graphics methods, systems and computer program products for use with a computer graphics system comprising a computer and a display module, the computer operable to generate image pixel values and to generate a display-controlling electrical output based on the pixel values, the pixels being representative of points in a scene, the scene comprising at least one object and one light source, the computer being operable to generate the pixel value by evaluating an integral of a selected function over an s-dimensional integration domain, the display-controlling electrical output being transmittable by the computer to the display module to cause the display module to display a human-perceptible image based on the pixel value, and the computer program product comprising the following computer-executable instructions recorded on a computer-readable medium: (a) instructions executable to enable the computer to generate sample points over the integration domain, the simple points generated such that there is at least once sample point in each of a plurality of strata distributed over the integration domain, the strata being defined by a rank-1 lattice; (b) instructions executable to enable the computer to, for respective ones of the sample points, generate a value for the function at the respective sample point; and (c) instructions executable to enable the computer to use the function values to generate an estimate for the value of the integral in relation to the at least one object and at least one light source, the estimate corresponding to the pixel value for the image, to enable the computer to generate the display-controlling electrical output based on the pixel value, and to enable the computer to cause the display module to display a human-perceptible image based on the display-controlling electrical output.

BACKGROUND OF THE INVENTION

In computer graphics, a computer is used to generate digital data that represents the projection of surfaces of objects in, for example, a three-dimensional scene, illuminated by one or more light sources, onto a top-dimensional image plane, to simulate the recording of the image by, for example, a camera. The simulated camera may include a lens for projecting the image of the scene onto the image plane, or it may comprise a pinhole camera in which case no lens is used. The two-dimensional image is in the form of an array of picture elements (which are variably referred to as "pixels" or "pels"), and the digital data generated for each pixel represents the color and luminance of the scene as projected onto the image plane at the point of the respective pixel in the image plane. The surfaces of the objects may have any of a number of characteristics, including shape, color, specularity, texture and so forth, which are preferably rendered in the image as closely as possible, to provide a realistic-looking image. Generally, the contributions of the light reflected from the various points in the scene to the pixel value representing the color, and intensity of a particular pixel are expressed in the form of the one or more integrals of relatively complicated functions. Since the integrals used in computer graphics generally do not have a closed-form solution, numerical methods must be used to evaluate them to generate the pixel value. Typically, a methodology referred to as the "Monte Carlo" method has been used in computer graphics to numerically evaluate the integrals. Generally, in the Monte Carlo method, to evaluate an integral $$\langle f \rangle = \int_{[0,1)^s} f(x)\,dx \tag{1}$$

where f(x) is a real function defined on an integration domain comprising the "s"-dimensional unit cube $[0,1)^s$ (that is, an s-dimensional cube each dimension of which includes "zero," and excludes "one"), a random point set $P_r=(\xi_1, \ldots \xi_r) \subset [0,1)^s$ of "r" independently realized points $\xi_i$, i=1, ..., r, is generated over the integration domain. The random points $\xi_i$ are used as sample points for which sample values $f(\xi_i)$ are generated for the function f(x). An estimate $\bar{f}$ for the value of the integral (equation (1)) is generated as $$\langle f \rangle \approx \bar{f} = \frac{1}{r}\sum_{i=1}^{r} f(\xi_i) \tag{2}$$

As the number "r" of sample points that are used in generating the sample values $f(\xi_i)$ increases, the value of the estimate $\bar{f}$ will converge toward the actual value of the integral $\langle f \rangle$. Generally, the distribution of values of the estimate $\bar{f}$ that will be generated for various values of "r," that is, for various numbers of sample points $\xi_i$ are distributed around the actual value $\langle f \rangle$ with a standard deviation σ which can be estimated by $$\sigma = \sqrt{\frac{1}{N-1}\left(\overline{f^2} - \bar{f}^2\right)} \tag{3}$$

if the sample points $\xi_i$ used to generate the sample values $f(\xi_i)$ are statistically independent, that is, if the points $\xi_i$ are truly positioned at random in the integration domain. This yields the probabilistic error bound $$\text{Prob}\left(\left|\int_{[0,01)^s} f(x)dx - \frac{1}{r}\sum_{k=1}^{r} f(\xi_k)\right| \le \frac{3\sigma(f)}{\sqrt{r}}\right) \approx 0.997. \tag{4}$$

The rate of convergence of $$o\left(\frac{1}{\sqrt{r}}\right)$$

is independent of the smoothness of the integrand f(x) and the number "s" of dimensions comprising the integration domain.

Several strategies can be used to improve convergence of the estimate $\bar{f}$ to the actual value $<f>$ of the integral. One strategy, which is described in the aforementioned Grabenstein patent application, is to use a low-discrepancy, strictly deterministic point methodology to generate the set of sample points that will be used in generating the sample values $f(\xi_i)$ for the estimate. A low-discrepancy, strictly deterministic methodology will ensure that the sample points are distributed throughout the integration domain $[0,1)^s$ without clumping in particular regions, which can occur if the sample points are randomly distributed.

Another strategy to improve the convergence is to stratify the integration domain $[0,1)^s$ into a number "K" of disjoint strata $A_j$, such that $$[0,1)^s = \bigcup_{j=1}^{K} A_j,$$

and separately evaluate the resulting integrals $$\int_{[0,1)^s} f(x)dx = \sum_{j=1}^{K} \int_{A_j} f(x) dx \qquad (5)$$

using a sample point $\xi_i$ obtained from each stratum $A_j$. Stratifying the integration domain $[0,1)^s$ can also be helpful in ensuring that sample points are reasonably well distributed throughout the integration domain $[0,1)^s$, and that they do not clump in the integration domain, which can occur if the locations of the sample points $\xi_i$ are randomly located in the integration domain.

Several stratification strategies have been proposed. Typically, previously-proposed stratification strategies, particularly stratification strategies that are based on axis-aligned grids, suffer exponential growth in the number of strata with increasing numbers of dimensions comprising the integration domain. Since integrands $f$ that are used in fields such as, for example, computer graphics, often have very high-dimensional integration domains, stratifying domains using such stratification strategies can be computationally quite intensive.

SUMMARY OF THE INVENTION

The invention provides a new and improved system and computer-implemented method for evaluating integrals using a Monte Carlo methodology in which the integration domain is stratified using a stratification methodology in which the number of strata is independent of the number of dimensions in the integration domain. Specifically, the invention provides a methodology that makes use of stratification based on rank-1 lattices.

In brief summary, in one aspect, the invention provides a system for numerically evaluating an integral of a function over an s-dimensional integration domain, the system comprising a sample point generator, a function value generator and an integral value estimate generator. The sample point generator is configured to generate a selected number of sample points over the integration domain, the sample points being generated such that there is at least one sample point in each of a plurality of strata distributed over the integration domain, the strata being defined by a rank-1 lattice. The function value generator is configured to, for respective ones of the sample points, generate a value for the function at the respective sample point. The integral value estimate generator is configured to use the function values generated by the function value generator at the respective sample points in generating an estimate for the value of the integral.

In another aspect, the invention provides a computer implemented method of numerically evaluating an integral of a function over an s-dimensional integration domain, the method comprising a sample point generation step, a function value generation step and an integral value estimate generation step. During the sample point generation step, a selected number of sample points are generated over the integration domain, the sample points being generated such that there is at least one sample point in each of a plurality of strata distributed over the integration domain, the strata being defined by a rank-1 lattice. During the function value generation step, for respective ones of the sample points, a value for the function at the respective sample point is generated. During the integral value estimate generation step, the function values generated during the function value generation step at the respective sample points are used in generating an estimate for the value of the integral.

In another aspect, the invention provides computer program product for use with a computer to provide a system for numerically evaluating an integral of a function over an s-dimensional integration domain. The computer program product comprises a computer readable medium having encoded thereon a sample point generator module, a function value generator module and an integral value estimate generator module. The sample point generator module is configured to enable the computer to generate a selected number of sample points over the integration domain, the sample points being generated such that there is at least one sample point in each of a plurality of strata distributed over the integration domain, the strata being defined by a rank-1 lattice. The function value generator module is configured to enable the computer to, for respective ones of the sample points, generate a value for the function at the respective sample point. The integral value estimate generator module is configured to enable the computer to use the function values generated by the function value generator at the respective sample points in generating an estimate for the value of the integral.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

The invention provides a computer graphics system and method for generating pixel values for pixels in an image of a simulated scene that makes use of a Monte Carlo methodology in which an integral or integrals is evaluated of function(s) by using sample points determined by stratifying the integration domain using rank-1 lattices. The function(s) represent the contributions of the light that is emitted from simulated light sources and reflected from the various simulated surfaces in the scene directed towards a simulated camera, and the integral(s) provide the pixel values for the respective pixels in the image. Stratifying the integration domain in this manner provides that the number of strata will not grow exponentially with the number of dimensions in the integration domain, which can occur with, for example, axis-aligned strata.

Figure 1:
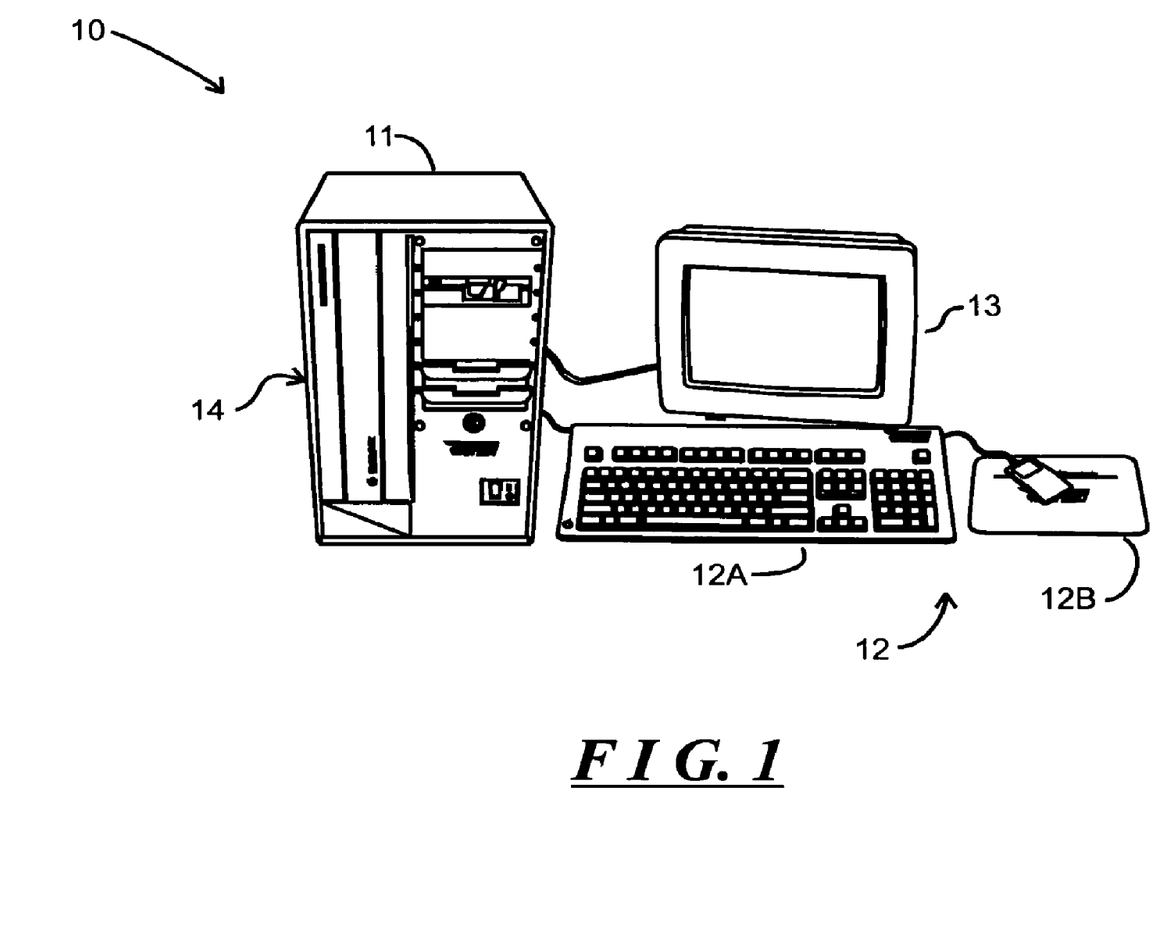
FIG. 1 depicts an illustrative computer graphics system that evaluates integrals using a Monte Carlo methodology in which the integration domain is stratified using a stratification methodology in which the number of strata is independent of the number of dimensions in the integration domain.

FIG. 1 attached hereto depicts an illustrative computer system 10 that makes use of such a stratification methodology. With reference to FIG. 1, the computer system 10 in one embodiment includes a processor module 11 and operator interface elements comprising operator input components such as a keyboard 12A and/or a mouse 12B (generally identified as operator input element(s) 12) and an operator output element such as a video display device 13. The illustrative computer system 10 is of the conventional stored-program computer architecture. The processor module 11 includes, for example, one or more processor, memory and mass storage devices, such as disk and/or tape storage elements (not separately shown), which perform processing and storage operations in connection with digital data provided thereto. The operator input element(s) 12 are provided to permit an operator to input information for processing. The video display device 13 is provided to display output information generated by the processor module 11 on a screen 14 to the operator, including data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 includes one or more network ports, generally identified by reference numeral 14, which are connected to communication links which connect the computer system 10 in a computer network. The network ports enable the computer system 10 to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

It will be helpful to initially provide some background on operations performed by the computer graphics system 10 in generating an image. Generally, the computer graphics system 10 generates an image that attempts to simulate an image of a three-dimensional scene as would be recorded by a camera. In that operation, for each pixel of the camera's image plane, the computer graphics system 10 numerically evaluates one or more integrals of functions that represent light that is directed toward the respective pixel from the scene. An illustrative function will be described below. The functions typically contain a number of terms, including one or more terms that represent light that is directly incident on the respective pixel from one or more light source sources, as well as one or more terms that represent light that, after having been emitted by a light source, is reflected by one or more surfaces of objects in the scene and ultimately directed toward the pixel.

To numerically evaluate the integral, the computer graphics system 10 shoots, or traces, simulated rays from a plurality of points in the pixel into the scene. At points in the scene at which the shot rays intersect surfaces of objects in the scene, the computer graphics system determines the contributions of light that are directed from those intersection points in the scene toward the respective points in the pixel from which the rays were shot. The computer graphics system can determine the contributions that are directed to the respective points in the pixel in a number of ways. In a path tracing methodology, which is described in more detail below, the computer graphics system 10 determines the illumination at the point in the scene at which the ray shot from the pixel intersects an object in the scene by shooting one or more rays from the intersection point in a plurality of directions, and determining the extent to which that point is illuminated directly by light sources, and indirectly by light that is reflected off of other surfaces of objects in the scene. After the computer graphics system has determined the extent to which the intersection point is illuminated, the direction or directions from which the point is illuminated, and other information that will be known by those skilled in the art, it generates a value that represents the light reflected toward the point in the pixel from which the ray was shot. The computer graphics system will repeat these operations for the various points in the pixel from which rays are shot, and will determine a pixel value for the entire pixel from the various values that are generated therefor. The computer graphics system also repeats the operations for all of the pixels to generate the final image. In a bidirectional path tracing methodology, the computer graphics system also shoots rays from light source or sources into the scenes and determines the pixel values in relation to points in at which those rays intersect points on surfaces of objects in the scene.

In a photon map methodology, prior to shooting rays from the pixels in the image plane into the scene, the computer graphics system 10 first generates a photon map representing photons that are incident on the surfaces of objects in the scene directly from the light sources and indirectly by photons that are reflected from various surfaces in the scene. After the computer graphics system has generated the photon map, it will shoot rays from the points on the pixels into the scene, and generate the pixel value in relation to the photons, if any, that are proximate the point of intersection of those rays with points on surfaces of the objects in the scene.

In both methodologies, as well as other methodologies as will be appreciated by those skilled in the art, the computer graphics system 10 uses the coordinates of the sample points that are obtained from the integration domain of the integral to control various aspects regarding the geometry while generating the image. These aspects may include, for example, determining the locations of the points on the various pixels from which rays are shot, determining the locations on light sources from which rays representing photons are shot, determining directions of reflection, determining whether to terminate a ray at a surface or to allow the ray to be reflected, and other aspects as will be aware to those skilled in the art.

As noted above, formally, the operations performed by the computer graphics system in generating pixel values for an image comprise the numerical evaluation of an integral over an integration domain that is defined over an s-dimensional unit cube $[0,1)^s$. In numerically evaluating the integral, the computer graphics system partitions the integration domain $[0,1)^s$ into a number "K" of disjoint strata $A_j$, such that $[0,1)^s = \cup_{j=1}^K A_j$, and separately evaluates the resulting integrals $$\int_{[0,1)^s} f(x)\,dx = \sum_{j=1}^K \int_{A_j} f(x)\,dx \qquad (6)$$

using a sample point obtained from each stratum $A_j$. The strata $A_j$ are defined by an "s" dimensional lattice. The lattice divides the integration domain into a plurality of strata $A_j$ of equal size, and the computer graphics system 10 obtains a sample point from each stratum $A_j$ for use in generating the approximation for the integral.

A lattice is a discrete set of points $L := P_n + Z^s \subset R^s$ that is closed under addition and subtraction, where $P_n := \{z_0, \ldots, z_{n-1}\}$, "Z" is an integer, "R" is a real number, and superscript "s" corresponds to the dimension of the lattice. In the case of a lattice defined by an axis-aligned regular grid, the dimension "s" is the number of basis vectors that, in linear combinations, yield the lattice points. According to another methodology, and in accordance with the invention, the lattice is defined using a single generator vector $g \in N^s$, where "N" is a member of the natural numbers, with the coordinates of the lattice points being defined by $$z_j := \frac{j}{n} g, \qquad (7)$$

where $j = 0, \ldots, n-1$. The lattice is referred to as a "rank-1" lattice, because it is generated using a single generator vector g.

An example of a rank-1 lattice that will be used herein is a lattice that is generated based on the Fibonacci sequence. The Fibonacci sequence $\{F_k\}$ is defined as $F_k := F_{k-1} + F_{k-2}$, with $F_1 = F_2 = 1$ and index "k" an integer. The two-dimensional Fibonacci lattice, which is based on the Fibonacci sequence, for $n = F_k$, $k \geq 3$, lattice vertices has the generator vector $$g = (1, F_{k-1}) \qquad (8)$$

It will be apparent from equations (7) and (8) that the coordinates $(\alpha, \beta)$ of the vertices $z_j$ comprising a two-dimensional Fibonacci lattice on the unit square $[0,1)^2$ can be readily generated in a "for"-loop, in which the first component "$\alpha$" is $$"j\frac{1}{F_k}"$$

and the second component "$\beta$" is $$"j\frac{F_{k-1}}{F_k} \bmod 1",$$

since, as noted above, $n = F_k$, the "k-th" element of the Fibonacci sequence. Fibonacci lattices of dimension "s" higher than "two" can be defined in a similar manner using an "s"-dimensional generator vector. For example, the generator vector $g = (1, F_{k-1}, F_{k-1}^2, \ldots, F_{k-1}^{s-1})$ can be used, which would provide a lattice in Korobov form.

As noted above, the computer graphics system 10 obtains sample points from strata $A_j$ that are defined by the lattice. The strata relate to unit cells that are associated with the respective vertices $z_j$. The unit cell of a rank-1 lattice is not uniquely specified, but a suitable unit cell, which is referred to as a Delaunay unit cell, can be specified such that the volume of an s-dimensional sphere that is inscribed in the unit cell is maximized. The unit cells that result on the rank-1 lattice are all of similar shape and can be mapped from one to another by means of rigid body transformations that basically perform a translation and/or rotation to move them from vertex to vertex.

Each unit cell is identified by the Voronoi diagram of the rank-1 lattice, whose nerve is constructed out of the "s" shortest vectors $v_1, \ldots, v_s$ from the origin of the coordinate system defining the lattice, to points of the lattice, where the value of the first component of each vector $v_j^{(1)}$ is greater than zero. This implies that, for all vectors, $v_j$, $v_j \neq 0$, and further that the value of "n," the number of vertices of the lattice, is greater than "one." The vectors span an s-dimensional parallelopiped $$B := (v_1 \ldots v_s) \qquad (9)$$

whose volume $$|B| := |\det B| = \frac{1}{n}.$$

Each of the "n" s-dimensional parallelepipeds in a rank-1 lattice restricted to the unit cube $[0,1)^s$ is a stratum $A_j$ that is induced by the bijection $$R_j : [0,1)^s \to A_j \qquad (10)$$

$$x \mapsto \left(\frac{j}{n} \cdot g + Bx\right) \bmod [0,1)^s$$

where the j-th lattice vertex $$z_j = \frac{j}{n} \cdot g$$

is used as an offset into the "s"-dimensional unit cube $[0,1)^s$ and "B," which is used as a matrix with the vectors $v_j$ comprising the columns of the matrix, defines a linear transformation that represents a rotation and/or shear. Equation (10) defines what can be referred to as a "reduced Cranley-Patterson rotation," which determines the location of the "j-th" sample point at which the function $f$ will be evaluated for the contribution to the estimate $\bar{f}$ of the value of the integral. Generally, the first term in the second line of equation (10), namely, $$\text{``}\frac{j}{n} \cdot g\text{'',}$$

$j=0, \ldots, n-1$, identifies the locations of the vertices for the basic "unrotated" rank-1 lattice. The second term in the second line of equation (9), namely, Bx, essentially provides a displacement from locations of the respective unrotated vertices to the particular sample point that will be used in evaluating the function. As will be described below, the computer graphics system 10 may use the same value for "x" for some or all of the vertices (reference the discussion below regarding correlated sampling), or it may use different values (reference the discussion below regarding jittered sampling). In equation (10), if different values are to be used for "x," "x" may be j-th element of an s-dimensional point set $P_r = (\xi_1, \ldots \xi_r) \subset [0,1)^s$, which may be generated using a random methodology, a strictly-deterministic low-discrepancy methodology, or other methodologies that will be apparent to those skilled in the art.

The particular parallelopiped that is defined by B will depend on the particular form of the generator vector g that is used to define the lattice, the number "n" of vertices that are to comprise the lattice, the number of dimensions, and other criteria as will be appreciated by those skilled in the art. For the two-dimensional Fibonacci lattice with $n = F_k > 1$ vertices, the matrix B is given by $$B = \frac{1}{F_k} \begin{pmatrix} j_1 & j_2 \\ j_1 F_{k-1} & -j_2 F_{k-1} \end{pmatrix} \quad (11)$$

where $$j_1 = F_{2\lfloor \frac{k-1}{4} \rfloor + 1} \text{ and } j_2 = F_{2\lfloor \frac{k+1}{4} \rfloor}.$$

Figure 2:
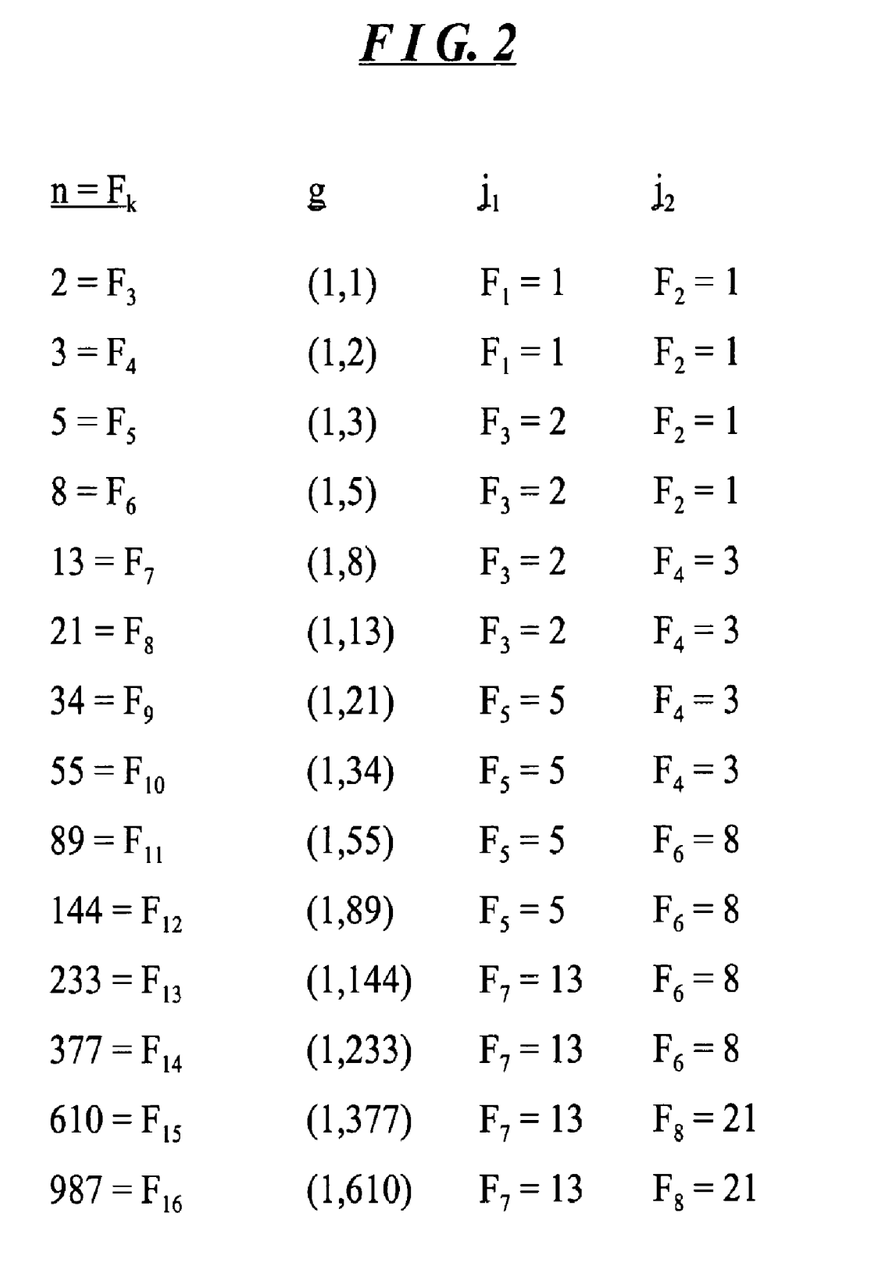
FIG. 2 depicts a table of information that is useful in understanding the operation of the computer graphics system depicted in FIG. 1.

FIG. 2 depicts a table that, for two-dimensional Fibonacci lattices of various numbers "n" of vertices, gives the generator vector g and values of $j_1$ and $j_2$ for use in connection with equation (11). As noted above, in the Fibonacci sequence, $F_1 = F_2 = 1$. Accordingly, the third element of the sequence, $F_3$, is the sum of the two preceding elements, and so $F_3 = F_2 + F_1 = 2$, which, in turn, corresponds to the number "n" of vertices in the lattice, as shown in the first line of the table depicted in FIG. 2. For the two-dimensional lattice associated with the $F_3$ element of the Fibonacci sequence (i) the generator vector $g = (1, F_{k-1}) = (1, F_2) = (1,1)$;

(ii) $j_1 = F_{2\lfloor \frac{3-1}{4} \rfloor + 1} = F_{2 \cdot 0 + 1} = F_1 = 1$;

(iii) $j_2 = F_{2\lfloor \frac{3+1}{4} \rfloor} = F_{2 \cdot 1} = F_2 = 1$;

and so (iv) $B = \frac{1}{2} \begin{pmatrix} 1 & 1 \\ 1 & -1 \end{pmatrix}$.

The values for items (i) through (iii) are depicted in the second, third and fourth columns, respectively, of the table depicted in FIG. 2. It will be apparent that the term $$\frac{j}{n} \cdot g$$

in the second line of equation (9), which defines the unrotated lattice, corresponds to vertices having coordinates $(0,0)$ for $j=0$ and $(\frac{1}{2}, \frac{1}{2})$ for $j=1$. The matrix B, in turn, defines strata that are on the order of $\frac{1}{2}$-by-$\frac{1}{2}$ in size. That is, (a) the stratum that is associated with the vertex having coordinates $(0,0)$ comprises the quadrilateral bounded by line segments between points $(0,0)$, $(\frac{1}{2},0)$, $(\frac{1}{2},\frac{1}{2})$ and $(0,\frac{1}{2})$, with the quadrilateral including the line segments between points $(0,0)$-$(\frac{1}{2},0)$ and $(0,0)$-$(0,\frac{1}{2})$ (except for points $(\frac{1}{2},0)$ and $(0,\frac{1}{2})$), and not including the line segments between points $(\frac{1}{2},0)$-$(\frac{1}{2},\frac{1}{2})$ and $(0,\frac{1}{2})$-$(\frac{1}{2},\frac{1}{2})$, and (b) the stratum that is associated with the vertex having coordinates $(\frac{1}{2},\frac{1}{2})$ comprises the quadrilateral bounded by line segments between points $(\frac{1}{2},\frac{1}{2})$, $(1,\frac{1}{2})$, $(1,1)$ and $(\frac{1}{2},1)$, with the quadrilateral including the line segments between points $(\frac{1}{2},\frac{1}{2})$-$(1,\frac{1}{2})$ and $(\frac{1}{2},\frac{1}{2})$-$(\frac{1}{2},1)$ (except for points $(1,\frac{1}{2})$ and $(\frac{1}{2},1)$), and not including the line segments through points $(1,0)$-$(1,1)$ and $(0,1)$-$(1,1)$.

As noted above, the strata associated with the respective vertices essentially represent a rigid translation, and it is apparent that the stratum associated with the vertex having coordinates $(\frac{1}{2},\frac{1}{2})$ has the same size and shape as the stratum associated with the vertex having coordinates $(0,0)$. The particular location within each stratum at which the vertex of the rotated lattice will be determined by the value of "x" (reference the second line of equation (10)).

As another illustration of the generation of values for g, $j_1$, $j_2$ and B, for the two-dimensional lattice associated with the ninth element of the Fibonacci sequence, $F_9$, there are $F_9 = F_8 + F_7 = 21 + 13 = 34$ vertices and, for the lattice that is associated with the element $F_9$ (i) the vector generator $g = (1, F_{k-1}) = (1, F_8) = (1, 21)$;

(ii) $j_1 F_{2\lfloor \frac{9-1}{4} \rfloor + 1} = F_{2\lfloor \frac{8}{4} \rfloor + 1} = F_{2 \cdot 2 + 1} = F_5 = 5$;

(iii) $j_2 = F_{2\lfloor \frac{9+1}{4} \rfloor} = F_{2\lfloor \frac{10}{4} \rfloor} = F_{2 \cdot 2} = F_4 = 3$;

and so (iv) $B = \frac{1}{34} \begin{pmatrix} 5 & 3 \\ 5 \cdot 21 & -3 \cdot 21 \end{pmatrix} = \frac{1}{34} \begin{pmatrix} 5 & 3 \\ 105 & -63 \end{pmatrix}$.

It will be apparent that the term $$\frac{j}{n} \cdot g$$

in the second line of equation (10), which defines the unrotated lattice, corresponds to vertices having coordinates (0,0) for j=0, (1/34,21/34) for j=1, (2/34,8/34) for j=2, (3/34,29/34) for j=3, (4/34,16/34) for j=4, (5/34,3/34) for j=5, and so forth. The matrix B, in turn, defines for the vertex associated with j=0, namely, the vertex having coordinates (0,0), the stratum comprising the quadrilateral bounded by line segments between points (0,0), (5/34,3/34), (8/34,8/34) and (3/34,5/34), with the quadrilateral including the line segments between points (0,0)-(5/34,3/34) and (0,0)-(3/34,5/34) (except for points (5/34,3/34) and (3/34,5/34), and not including the line segments between points (5/34,3/34)-(8/34,8/34) and (3/34,5/34)-(8/34,8/34). The strata that are associated with the other vertices can be determined in a similar manner. As with the strata associated with the two-vertex lattice ($F_3$) described above, in the case of the thirty-four vertex ($F_9$) lattice, the strata associated with all of the vertices have the same sizes and shapes Other lines of the table depicted in FIG. 2 depict similar information for two-dimensional Fibonacci lattices having different numbers of vertices.

Benefits of stratified sampling using rank-one lattices will be illustrated using several examples. Generally, in contrast to stratification using grid-aligned lattices, stratifying an "s"-dimensional domain using rank-1 lattices provides that the number of strata will not grow exponentially with the number of dimensions in the integration domain. This will be illustrated in connection with jittered sampling, correlating sampling and correlated trajectory sampling methodologies.

Jittered Sampling by Rank-1 Lattices

Generally, jittered sampling is achieved by placing the samples points used for evaluating the integrand $f$ in random positions within respective strata. Using the stratification that is induced by rank-1 lattices (equation (10)), the value of an integral can be estimated as follows:

$$\int_{[0,1)^s} f(x)dx = \sum_{j=0}^{n-1} \int_{A_j} f(x)dx \qquad (12)$$

$$= \frac{1}{n}\sum_{j=0}^{n-1} \int_{[0,1)^s} f(R_j(x))dx$$

$$\approx \frac{1}{n}\sum_{j=0}^{n-1} f(R_j(\xi_j))$$

In equation (12), the first line reflects the fact that the integral over the entire integration domain, represented by the left hand side, corresponds to the sum of the integrals over the various strata $A_j$, j=0, . . . , n−1. The second line of equation (12) follows from the fact that, since, if "x" is a continuous variable spanning the integration domain, $R_j(x)$ will also be continuous and span the same entire integration domain. In that case, if the integral is summed "n" times, the value of the integral can be obtained by dividing the sum by "n." Finally, the third line reflects that the value of the "j-th" integral in the sum in the second line can be estimated by evaluating the function $f$ using the "j-th" sample point, which corresponds to $R_j(\xi_j)$.

In determining the value for the estimate $\tilde{f}$, which corresponds to the last line of equation (12), the computer graphics system 10 will, for each value of index "j," make use of the generator vector g to generate the $$\frac{j}{n} \cdot g$$

term of $R_j(\xi_j)$ (reference equation (10)), and the "j-th" element $\xi_j$ of an "s"-dimensional random sequence $\{\xi_j\}_{j=0}^{n-1}$ to generate the Bx term, where the "j-th" element $\xi_j$ is used as vector "x" in generating $R_j(\xi_j)$ (equation (10)). The sum $R_j(\xi_j)$ is used as the sample point in evaluating the function $f$ for the respective "j-th" sample point. Since different elements $\xi_j$ of the random sequence $\{\xi_j\}_{j=0}^{n-1}$ are used in generating $R_j(\xi_j)$ for different values of index "j," the sample points $\xi_j$ are likely to have different displacements within the various strata $A_j$. However since there is at least one sample point $R_j(\xi_j)$ in each stratum, and since the strata are uniformly distributed over the integration domain, the sample points will be reasonably well distributed around the integration domain. It will be appreciated that several elements $\xi_j$ of the random sequence $\{\xi_j\}_{j=0}^{n-1}$ may clump, and may even have the same value, but the stratification induced by the $$\frac{j}{n} \cdot g$$

term of equation (10) will ensure that the sample points $R_j(\xi_j)$ that are used in evaluating the function $f$ are well distributed over the integration domain. A more uniform distribution may be achieved if the elements $\xi_j$ of the random sequence $\{\xi_j\}_{j=0}^{n-1}$ are generated using, for example, a strictly-deterministic, low-discrepancy methodology.

Using rank-1 lattices, the computer graphics system 10 can readily partition the s-dimensional unit cube $[0,1)^s$ into a number "n" of strata, with the number "n" being independent of the number "s" of dimensions. The estimator for the value of the integral, which is described in equation (12), and particularly in the last line of that equation, is unbiased and can also be used in connection with generating estimates of the values of integrals of functions related to fields other than computer graphics.

Correlated Sampling By Rank-1 Lattices

As with jittered sampling, correlated sampling also involves evaluating a sum of integrals of a function $f$ over the s-dimensional unit cube. However, unlike jittered sampling, in which elements of a random "s"-dimensional sequence $\{\xi_j\}_{j=0}^{n-1}$ is used in generating the sample points at which the function $f$ is evaluated (equation (12)), in correlated sampling one randomly generated element $\xi$ is used in generating all of the sample points (equation (10)) that are used in evaluating the function $f$ for use in the sum. This is derived from equation (12) by, with reference to the second line of equation (12), interchanging the finite sum and the integral. That is, $$\frac{1}{n}\sum_{j=0}^{n-1} \int_{[0,1)^s} f(R_j(x))dx = \frac{1}{n}\int_{[0,1)^s} \sum_{j=0}^{n-1} f(R_j(x))dx \qquad (13)$$

-continued $$\approx \frac{1}{n} \sum_{j=0}^{n-1} f(R_j(\xi))$$

It will be appreciated that, in equation (13), the left hand side of the first line of the equation corresponds to the right hand side of the second line of equation (12). In generating the estimate $\bar{f}$, which corresponds to the last line of equation (13), the computer graphics system 10 will, for each value of "j," make use of the generator vector g in generating the $$\frac{j}{n} \cdot g$$

term of $R_j(\xi)$, and the same randomly-generated vector "ξ" as "x" in the Bx term of the sample point $R_j(\xi)$. As noted above, in generating the image, the computer graphics system 10 will separately evaluate the integral for each of the pixels in the image; and in that case the computer graphics system 10 may use the same element ξ for all of the integrals associated with the various pixels, or, alternatively, the computer graphics system 10 may use different random elements . . . $\xi_{i-1}$, $\xi_i$, $\xi_{i+1}$, . . . for the integral associated with the . . . "i-1st," "i-th", "i+1st" pixel, respectively. One advantage of using different elements for the various integrals is that that may result in the generation of noise in the image, which can obscure aliasing artifacts that might otherwise be present in an image.

Since stratified samples are independent, there is no correlation between them; in particular, there is no minimum distance property. Therefore, no variance reduction will be guaranteed. Minimum distance constraints can be imposed by, for example, applying Lloyd's relaxation algorithm in a conventional manner. Combined with modified sample weights by post-stratification, the estimate $\bar{f}$ converges to the actual value <f> of the integral. For Riemann-integrable functions the unbiased estimator (reference the second line of equation (13)) has a reduced variance of order $$O\left(\frac{1}{n^2} \ln^{2s} n\right),$$

if the set of sample points $$(R_j(\xi))_{j=0}^{n-1}$$

is of sufficiently low discrepancy.

The estimator (reference the second line of equation (13)) that is used for an integral can be realized by generating one random s-dimensional vector $\xi \in [0,1)^s$ and replicating it using equation (10), that is, using the product of B and the random element ξ as an offset for each of the unrotated lattice vertices, which, as noted above, are defined by $$\frac{j}{n} \cdot g.$$

The resulting correlated samples have a guaranteed minimum distance and good uniformity properties, if the generator vector g is suitably chosen. If values for "x" are uniformly distributed the transformation B can be omitted, in which case the bijection (reference equation (10)) reduces to $$R_j^{CP} : [0,1)^s \to [0,1)^s \quad (14)$$

$$x \mapsto \left(\frac{j}{n} \cdot g + x\right) \bmod [0,1)^s$$

which corresponds to a Cranley-Patterson rotation on a rank-1 lattice.

Correlated Trajectory Splitting by Rank-1 Lattices

Trajectory splitting can improve efficiency depending on the correlation of the integrand with respect to its lower dimensional projections. Trajectory splitting is used in a number of types of simulations, including but not limited to computer graphics. Trajectory splitting can be used in several ways in computer graphics, one of which will be described here and another below. One use of trajectory splitting in connection with computer graphics is tracing multiple shadow rays to an light source that has a non-zero area. As noted above, in ray tracing, path tracing and similar methodologies, to determine a pixel value for a pixel in an image, the computer graphics system 10 traces a plurality of rays from respective points in the pixel into a simulated scene. For each such ray, if the ray intersects a surface of an object in the scene, the computer graphics system 10 can trace one or more rays, which are referred to as shadow rays, from the point of intersection of the shot ray to various points on the area of the light source. If a shadow ray intersects another object in the scene, the point of intersection of the shot ray is in the other object's shadow for that shadow ray.

On the other hand, if the shadow ray does not intersect another object in the scene, the light source is deemed to contribute to the direct illumination of the point in the scene for the pixel from which the ray was shot. The shadow rays that are traced from the point of intersection to the light source are distributed over the surface of the light source, and so some of the shadow rays may intersect other objects in the scene, whereas others of the shadow rays may not. The extent to which the point of intersection of the shot ray is illuminated by the light source is a function of the number of shadow rays from that point on the object that do not intersect other objects. Generally, if a scene contains multiple light sources, similar operations will be performed for each light source to determine the extent to which the point at which the ray that was shot from the pixel intersects the object, is illuminated by the various light sources.

As noted above, a pixel also has an area, and the computer graphics system will typically shoot simulated rays into the scene from several points within the area of the pixel, and trace shadow rays from points at which they intersect the various objects. Generally, the variance of the integrand with respect to the area of the pixel is less than the variance with respect to the area of the light source.

In trajectory splitting, the samples (illustratively, the shadow rays) that are split off of one instance (illustratively, the ray that is traced from the pixel into the scene) do not need to be independent. Continuing with the computer graphics shadow ray example, using a vector "x" to refer to a location in the pixel, and a vector "y" to refer to a location on the light source, the function $f$ in the integral is a function of both vector "x" and vector "y," that is $f(x,y)$, with vector "x" being associated with $s_1$ dimensions and vector "y" being associated with $s_2$ dimensions. Accordingly, the portion of the integration domain that is associated with vector "x" is the $s_1$-dimensional unit cube $[0,1)^{s_1}$ and the portion of the integration domain that is associated with the vector "y" is the $s_2$ dimensional unit cube $[0,1)^{s_2}$. In that case, if $s_1+s_2=s$, which will be the case if the vectors "x" and "y" are associated with all of the dimensions comprising the integration domain, the integral of f is evaluated as follows $$\int_{(0,1)^{s_1}} \int_{(0,1)^{s_2}} f(x,y)\,dy\,dx = \int_{[0,1)^{s_1}} \sum_{j=0}^{n-1} \int_{A_j} f(x,y)\,dy\,dx \quad (15)$$

$$= \int_{[0,1)^{s_1}} \frac{1}{n} \int_{[0,1)^{s_2}} \sum_{j=0}^{n-1} f(x, R_j(y))\,dy\,dx$$

$$\approx \frac{1}{r}\sum_{i=0}^{r-1} \frac{1}{n}\sum_{j=0}^{n-1} f(\xi_i, R_j(\zeta_i))$$

where $\xi_i$ and $\zeta_i$ are the "i-th" elements of two random sequences, namely, an $s_1$-dimensional random sequence $\{\xi_i\}_{i=0}^{r-1}$ and an $s_2$-dimensional random sequence $\{\zeta_i\}_{i=0}^{r-1}$. Equation (15) essentially reflects the fact that the rank-1 lattice, instead of being used to stratify the entire "s"-dimensional integration domain, can be used to stratify a subset $s_2<s$ of the dimensions comprising the integration domain. Continuing with the shadow-ray example, the element $\xi_i$ is used to determine the location of a point within the pixel from which the simulated ray is to be shot into the scene. On the other hand, $R_j(\zeta_i)$ (reference equation (10)) is used to determine the location on the area light source toward which a shadow ray will be traced from the point at which the ray shot from the pixel intersects an object in the scene.

It will be apparent that, in evaluating the integral according to the last line of equation (15), the sampling methodology essentially corresponds to subdividing the area light source into a number $j=0, \ldots, n-1$ of light sources that are induced by the rank-1 lattice stratification (reference equation (10)). For each of the "r" rays that are shot into the scene from the point in the pixel that is associated with the "i-th" element $\xi_i$ of the random sequence $\{\xi_i\}_{i=0}^{r-1}$ if the shot ray intersects an object in the scene, one shadow ray is traced from the point at which the shot ray intersects an object in the scene, to one point within each of the $j=1, \ldots, n$ strata on the light source, the point in the stratum that is determined by the "i-th" element of the random sequence $\{\zeta_i\}_{i=0}^{r-1}$ Since for each element $\xi_i$ of the random sequence $\{\xi_i\}_{i=0}^{r-1}$ (which, as noted above, is used in determining the location within the pixel from which the ray shot will be shot into the scene), the same element $\zeta_i$ of the random sequence $\{\zeta_i\}_{i=0}^{r-1}$ will be used in generating values for $R_j(\zeta_i)$ (which is used in determining the locations in the various strata on the light source towards which the "j" respective shadow rays will be traced) for various values of "j," the shadow rays that are traced from the point of incidence of the shot ray will have the same displacements in the various strata that are induced on the light source.

On the other hand, for the "r" different points in the pixel from which rays are shot, locations of which are determined using the different elements $\ldots, \xi_{i-1}, \xi_i, \xi_{i+1} \ldots$ of the random sequence $\{\xi_i\}_{i=0}^{r-1}$, a different element $\ldots, \zeta_{i-1}, \zeta_i, \zeta_{i+1} \ldots$ of the random sequence $\{\zeta_i\}_{i=0}^{r-1}$ will be used in determining the displacements within the various strata on the light source toward which the shadow rays will be traced. Accordingly, the displacements in the respective strata on the light source towards which shadow rays will be shot will usually differ for the different rays that are shot in the scene from the respective pixel. It will be appreciated, however, that, since the elements $\zeta_i$ are from a random "$s_2$"-dimensional sequence, it is possible that two more elements of the sequence $\{\zeta_i\}_{i=0}^{r-1}$ may have the same or close to the same value, in which case, shadow rays that are traced from the intersection points in the scene will be traced to the same or almost the same points on the light source.

The jittered sampling, correlated sampling and trajectory splitting methodologies as described above will be further described in connection with three particular applications that are used in connection with generating images in computer graphics, namely, generating photon maps, path tracing and distribution ray tracing.

Photon Map Generation

As noted above, the photon map methodology generally includes two phases, namely, a first "photon map generation" phase followed by a "gather" phase. In the photon map generation phase, the computer graphics system 10 shoots rays that represent paths taken by simulated photons emitted by one or more simulated light sources into a simulated scene. Each rays is in the form of a random walk that is traced through at least a portion of the simulated scene. The computer graphics system determines whether a ray intersects a surface of an object in the scene, and, if so, stores information relating to the photon associated with the ray in a database. The information which may include, for example, the photon's color, its direction of incidence, the location of the intersection point, and other information that will be apparent to those skilled in the art, in a database. Depending on a number of criteria, including characteristics of the surface of the simulated object at the point at which the photon intersects the object, the number of times (if any) the photon has been previously reflected, and other criteria that will be apparent to those skilled in the art, the computer graphics system may terminate the photon at the point at which it intersects the object, or it may allow the photon to be reflected along another ray. If the computer graphics system determines that the photon is to be reflected, the computer graphics system determines the direction of reflection using a number of criteria, including, among other things, the angle of incidence and characteristics of the simulated object's surface, such as whether the surface is specular, glossy or diffuse. The computer graphics system can make use of random factors in several ways, including, for example, determining whether to terminate a ray at a surface that the ray intersects, or to allow the ray it to be reflected. The computer graphics system may also use random factors to jitter the angle with which a ray is to reflected, and as well as in other ways as will be apparent to those skilled in the art.

After the computer graphics system has shot a number of rays into the scene, it initiates the second "gather" phase of the photon map methodology. In that phase, as described above, the computer graphics system 10 shoots simulated rays from a simulated image plane of a simulated camera into the scene.

The rays that are shot from the image plane into the scene during the gather phase essentially correspond to the directions into the scene that are visible from the respective points on the pixel from which they are shot. If a gather ray intersects the surface of an object in the scene, the computer graphics system makes use of the information regarding the photons, if any, that intersected the surface proximate the point at which the ray shot from the camera intersected the surface, including the directions of incidence of the respective photons, the direction of incidence of the gather ray, and the various characteristics of the surface on which the gather ray is incident. The computer graphics system uses that information to determine the brightness and color of the scene at that point in the image.

As noted above, for rays that are shot into the simulated scene, random factors can be used in several ways, including determining whether to terminate a ray at a surface that the ray intersects or whether to allow the ray to be reflected, determining the direction of reflection of the photons that are shot into the scene during the photon map generation phase, and other ways that will be appreciated by those skilled in the art. The random factors that are used to jitter each ray are collected into an "s"-dimensional vector $\xi \in [0,1)^s$, where "s" is related to the maximum number of reflections or refractions that a photon may have before it is terminated. Problems have arisen in the past, since stratification of high-dimensional integration domains has not been available. However, stratification using rank-1 lattices provides a solution to this problem. In particular, the computer graphics system 10 makes use of a sequence of random s-dimensional vectors $\{\xi_j\}_{j=0}^{n-1}$, $\xi_j \in [0,1)^s$, and uses the "j-th" element $\xi_j$ of the sequence in generating $R_j(\xi_j)$ (reference equation (10)) for the "j-th" random walk. By jittering the random walk using a random number set, the computer graphics system 10 can reduce the likelihood that correlation patterns will develop in the traces that the computer graphics system shoots into the scene.

Path Tracing

In path tracing, the computer graphics system 10 evaluates a rendering equation that is of the form $$L(\vec{x},\vec{\omega}) = L_e(\vec{x},\vec{\omega}) + \int_A L(\vec{x}\,',\omega(\vec{x}\,',\vec{x})) f_r(\vec{x},\omega(\vec{x}\,',\vec{x})) G(\vec{x},\vec{x}\,') V(\vec{x},\vec{x}\,') dA' \quad (16)$$

where (i) $L(\vec{x},\vec{\omega})$ on the left-hand side of equation (16) represents the luminance at point $\vec{x}$ in direction $\vec{\omega}$;

(ii) $L_e(\vec{x},\vec{\omega})$ on the right-hand side is an emission term representing the illumination emitted from point $\vec{x}$ in the direction $\vec{\omega}$;

(iii) $L(\vec{x}\,',\omega(\vec{x}\,',\vec{x}))$ on the right-hand side represents the luminance at another point $\vec{x}\,'$ in the scene that is reflected in the direction $\omega(\vec{x}\,',\vec{x})$ toward point $\vec{x}$;

(iv) $f_r(\vec{x},\omega(\vec{x}\,',\vec{x}))$ on the right-hand side is a bidirectional scattering distribution function that describes how much of the light incident on from the point $\vec{x}\,'$ is reflected, refracted or otherwise scattered in the direction $\omega(\vec{x}\,',\vec{x})$ toward the point $\vec{x}$, and is generally the sum of a diffuse component, a glossy component and a specular component;

(v) $G(\vec{x},\vec{x}\,')$ on the right-hand side is a geometric term that is a function of the orientation of the surfaces that contain points $\vec{x}\,'$ and $\vec{x}$ relative to one another, specifically, $$G(\vec{x},\vec{x}\,') = \frac{\cos\theta \cos\theta'}{|\vec{x}-\vec{x}\,'|^2} \quad (17)$$

where $\theta$ and $\theta'$ are angles of the line between points $\vec{x}$ and $\vec{x}\,'$, respectively relative to the normals of the surfaces that contain points $\vec{x}$ and $\vec{x}\,'$, and (vi) $V(\vec{x},\vec{x}\,')$ on the right-hand side of equation (16) is a visibility function that equals the value one if the point $\vec{x}\,'$ is visible from the point $\vec{x}$ and zero if the point $\vec{x}\,'$ is not visible from the point $\vec{x}$.

It will be appreciated that point $\vec{x}$ represents the point at which the luminance is to be determined and point $\vec{x}\,'$ represents another point in the scene from which light may be emitted (in the case of a light source) or reflected toward the point $\vec{x}$. Essentially equation (16) reflects the fact that the luminance at point $\vec{x}$ in the direction $\vec{\omega}$ is generally the sum of two components. One component, which is represented by item (ii) above ($L_e(\vec{x},\vec{\omega})$), represents the light (if any) that is emitted from the point $\vec{x}$ in the direction $\vec{\omega}$. This component will be non-zero if the point $\vec{x}$ is on a light source.

The second component, which is represented by the integral on the right hand side of equation (16), represents the light (if any) that is directed toward point $\vec{x}$ from elsewhere in the scene, including, for example, light sources and other surfaces, and that is directed to or reflected or otherwise scattered towards the point $\vec{x}$ from other points $\vec{x}\,'$ in the scene that are visible from point $\vec{x}$. The integral may be non-zero for points on light sources as well as for points on other objects in the scene. The integral in equation (16) is evaluated over the area A' of the surface of a hemisphere that is formed from a sphere that is centered on the point $\vec{x}$ and generally bisected by a plane that is tangent to the surface at point $\vec{x}$.

The computer graphics system 10 numerically evaluates the integral in equation (16) by shooting a plurality of rays from respective points on the pixel into the scene. For each ray shot from the pixel, if the path of the ray intersects the surface of an simulated object in the scene, in addition to shooting shadow rays to light sources as described above to determine the extent to the point on the object is illuminated by a light source, the computer graphics system 10 can also determine the extent to which the point on the object is illuminated by light reflected from elsewhere in the scene. In the latter operation, the computer graphics system 10 can extend the ray by tracing a path from the point on the object that the path of the ray as shot from the pixel intersected, in a direction that is generally a reflection of the path of incidence. The computer graphics system can repeat these operations through a plurality of iterations, or until the path of the ray does not intersect an object in the scene. In addition, the computer graphics system 10 will perform similar operations for all of the rays that are shot from the pixel, and the combine the results for the respective rays to determine the pixel value for the pixel.

It will be appreciated that the computer graphics system 10 makes use of a large number of paths in determining the pixel value, it can use correlated sampling to determine the locations of the points of the pixel. Since in correlated sampling the same value $\xi$ is used for all of the sample points for the respective pixel, the computer graphics system 10 can generate the sample points $R_j(\xi)$ for the pixel by use of a rigid transformation, which is more efficient than, for example, jittered sampling.

Distribution Ray Tracing

The distribution ray tracing methodology extends the path tracing methodology as described above, by adding trajectory splitting. In the distribution ray tracing methodology, if a ray shot from the simulated image plane into the scene intersects the simulated surface of a simulated object in a scene, instead of using a single ray reflected from the surface, the computer graphics system reflects a plurality of rays along a like plurality of paths from the intersection point on the surface. The computer graphics system divides the hemisphere into a plurality of strata, one for each path that is to be reflected from the surface. The computer graphics system directs a ray through each stratum, and can make use of trajectory splitting as described above to determine the specific direction through the respective strata. Accordingly, the computer graphics system will trace a plurality of paths from the point at which the ray's path intersects the point on the object. The computer graphics system can perform trajectory splitting at any point at which a ray's path intersects a point on an object.

The invention provides a number of advantages. In particular, the invention provides a new and improved system and computer-implemented method for evaluating integrals using a Monte Carlo methodology in which the integration domain is partitioned into a plurality of strata using a stratification methodology in which the number of strata is independent of the number of dimensions comprising the integration domain. Specifically, the invention provides a methodology that makes use of stratification based on rank-1 lattices. Systems and computer-implemented methods according to the invention find utility in a number of applications, including but not limited to computer graphics.

The invention is also beneficial in connection with one problem that can arise in computer graphics, namely, aliasing, which gives rise to artifacts in the form of, for example, jagged edges. A computer graphics system 10 in accordance with the invention does not eliminate aliasing artifacts, but it does, however, mask them by noise that can arise from randomization. To accomplish this, the sample points are preferably random as between different pixels; however, the samples can be correlated within a pixel. The estimator described above in connection with the last line of equation (13) matches these requirements. Within a pixel, the samples are a shifted lattice, with the amount of shift being determined by the value of the random element $\xi$ that is used for the pixel, providing good uniformity of distribution throughout the area of the pixel, which, in turn, provides for fast convergence. For different pixels, the various values of elements . . . $\xi_{i-1}, \xi_i, \xi_{i+1}$ . . . that are used provides noise that can mask the aliasing artifacts in the image that is generated.

It will be appreciated that a number of changes and modifications may be made to the invention as described herein. For example, although the invention has been described in the context of a computer graphics system, it will be appreciated that the invention will find utility in other applications in which integrals are numerically evaluated using the Monte Carlo methodology.

In addition, although the invention has been described in connection with a rank-1 lattice in the form of a lattice based on the Fibonacci sequence, it will be appreciated that other forms of rank-1 lattices may be used.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A computer program product for use with a computer graphics system, the computer graphics system comprising a computer and a display module, the computer being operable to generate a display-controlling electrical output based on numerical evaluation of an integral of a function over an s-dimensional integration domain, the display-controlling electrical output being transmittable by the computer to the display module to cause the display module to display a human-perceptible image responsive to the numerical evaluation of the integral, the computer program product comprising a computer readable physical medium having recorded thereon:

A. first computer-executable instructions, recorded on the computer-readable physical medium and executable by the computer to enable the computer to generate a selected number of sample points over the integration domain, the sample points being generated such that there is at least one sample point in each of a plurality of strata distributed over the integration domain, the strata being defined by a rank-1 lattice;

B. second computer-executable instructions, recorded on the computer-readable physical medium and executable by the computer to enable the computer to, for respective ones of the sample points, generate a value for the function at the respective sample point; and C. third computer-executable instructions, recorded on the computer-readable physical medium and executable by the computer to enable the computer to use the function values generated at the respective sample points in generating an estimate for the value of the integral and to generate therefrom the display-controlling electrical output based on the estimate, and to enable the computer to cause the display module to display a human-perceptible image based on the display-controlling electrical output.

2. A computer program product as defined in claim 1 in which the integration domain comprises the "s"-dimensional unit cube $[0,1)^s$.

3. A computer program product as defined in claim 2 in which, for each stratum $A_j$, the first computer-executable instructions comprise instructions to enable the computer to generate the "j-th" sample point $R_j(x)$ in accordance with the bijection $$R_j: [0, 1)^s \to A_j$$

$$x \mapsto \left(\frac{j}{n} \cdot g + Bx\right) \bmod [0, 1)^s$$

where "n" is the selected number of sample points, g is a generator vector for the rank-1 lattice and B is a matrix that defines a linear transformation that represents a rotation and/or shear.

4. A computer program product as defined in claim 3 in which the first computer-executable instructions comprise instructions executable to enable the computer to generate the "j-th" sample point such that "x" is a vector.

5. A computer program product as defined in claim 4 in which the first computer-executable instructions comprise instructions executable to enable the computer to generate the "j-th" sample point such that the vector "x" is the same for all sample points.

6. A computer program product as defined in claim 4 in which, for each value of index "j," the first computer-executable instructions comprise instructions to enable the computer to generate the "j-th" sample point such that the vector "x" is the "j-th" element of a sequence of vectors $$P_n = (\xi_0, \ldots, \xi_{n-1}).$$

7. A computer program product as defined in claim 6 in which the elements of the sequence are generated using a random sequence generation methodology.

8. A computer program product as defined in claim 6 in which at least one vector in the sequence is an "s"-dimensional vector.

9. A computer program product as defined in claim 2 in which the sample point generator module is configured to enable the computer to generate the "j-th" sample point such that the "s-"dimensional unit cube $[0,1)^s$ comprises an "$s_1$"-dimensional portion and an "$s_2$"-dimensional portion, where each sample point is defined by $$(\xi_i, R_j(\zeta_i))$$

where $\xi_i$ is an element of an "s"-dimensional sequence, $\zeta_i$ is an element of an "$s_2$"-dimensional sequence, and $R_j$ is defined by the bijection $$R_j: [0, 1)^{s_2} \to A_j$$

$$x \mapsto \left(\frac{j}{n} \cdot g + Bx\right) \bmod [0, 1)^{s_2}$$

where "n" is the selected number of sample points, g is a generator vector for the rank-1 lattice, and B is a matrix that defines a linear transformation that represents a rotation and/or shear.

10. A computer program product as defined in claim 9 in which the first computer-executable instructions comprise instructions executable to enable the computer to generate the "j-th" sample point such that the elements of the "$s_1$"-dimensional sequence are generated using a random sequence generation methodology.

11. A computer program product as defined in claim 9 in which the first computer-executable instructions comprise instructions executable to enable the computer to generate the "j-th" sample point such that the elements of the "$s_2$"-dimensional sequence are generated using a random sequence generation methodology.

12. A computer program product for use with a computer graphics system, the computer graphics system comprising a computer and a display module, the computer being operable to generate a pixel value for a pixel in an image, and to generate a display-controlling electrical output based on the pixel value, the pixel being representative of a point in a scene, the scene comprising at least one object and at least one light source, the computer being operable to generate the pixel value by an evaluation of an integral of a selected function over an s-dimensional integration domain, the display-controlling electrical output being transmittable by the computer to the display module to cause the display module to display a human-perceptible image based on the pixel value, the computer program product comprising a computer readable physical medium having recorded thereon:

A. first computer-executable instructions, recorded on the computer-readable physical medium and executable by the computer to enable the computer to generate a selected number of sample points over the integration domain, the sample points being generated such that there is at least one sample point in each of a plurality of strata distributed over the integration domain, the strata being defined by a rank-1 lattice;

B. second computer-executable instructions, recorded on the computer-readable physical medium and executable by the computer to enable the computer to, for respective ones of the sample points, generate a value for the function at the respective sample point; and C. third computer-executable instructions, recorded on the computer-readable physical medium and executable by the computer to enable the computer to use the function values generated at the respective sample points in generating an estimate for the value of the integral in relation to the at least one object and at least one light source, the estimate corresponding to the pixel value for the image, to enable the computer to generate the display-controlling electrical output based on the pixel value, and to enable the computer to cause the display module to display a human-perceptible image based on the display-controlling electrical output.

13. A computer program product as defined in claim 12 in which the integration domain comprises the "s"-dimensional unit cube $[0,1)^s$ and for each stratum $A_j$, the sample point generator module is configured to enable the computer to generate the "j-th" sample point $R_j(x)$ in accordance with the bijection $$R_j: [0, 1)^s \to A_j$$

$$x \mapsto \left(\frac{j}{n} \cdot g + Bx\right) \bmod [0, 1)^s$$

where "n" is the selected number of sample points, g is a generator vector for the rank-1 lattice, and B is a matrix that defines a linear transformation that represents a rotation and/or shear.

14. A computer program product as defined in claim 13 in which the first computer-executable instructions comprise instructions to enable the computer to use the same vector "x" for at least some of the sample points.

15. A computer program product as defined in claim 14 in which at least part of the selected function represents a path tracing methodology in which the second computer-executable instructions comprise instructions executable to enable the computer to generate the function value associated with a point in the scene in relation to a plurality of simulated traces projected from the point, the directions of the traces being determined by strata defined on at least a portion of a sphere centered on the point induced by at least a portion of the rank-1 lattice.

16. A computer program product as defined in claim 13 in which, for each value of index "j," the first computer-executable instructions comprise instructions executable to enable the computer to generate the "j-th" sample point such that the vector "x" is the "j-th" element of a sequence of vectors $$P_n = (\xi_0, \ldots, \xi_{n-1}).$$

17. A computer program product as defined in claim 16 in which the elements of the sequence are generated using a random sequence generation methodology.

18. A computer program product as defined in claim 17 in which at least part of the selected function represents a photon map methodology in which the second computer-executable instructions comprise instructions executable to enable the computer to generate the function values by using sample points generated by the computer using least some of the vectors from the sequence to control a random walk of traces from the light source through at least a portion of the scene.

19. A computer program product as defined in claim 13 in which the first computer-executable instructions comprise instructions executable to enable the computer to generate the "j-th" sample point such that the "s-"dimensional unit cube $[0,1)^s$ comprises an "$s_1$"-dimensional portion and an "$s_2$"-dimensional portion, where each sample point is defined by $$(\xi_i, R_j(\zeta_i)),$$

where $\xi_i$ is an element of an "$s_1$"-dimensional sequence, $\zeta_i$ is an element of an "$s_2$"-dimensional sequence, and $R_j$ is defined by the bijection $$R_j: [0, 1)^{s_2} \to A_j$$

$$x \mapsto \left(\frac{j}{n} \cdot g + Bx\right) \bmod [0, 1)^{s_2}$$

where "n" is the selected number of sample points, g is a generator vector for the rank-1 lattice, and B is a matrix that defines a linear transformation that represents a rotation and/or shear.

20. A computer program product as defined in claim 19 in which the first computer-executable instructions comprise instructions executable to enable the computer to generate the "j-th" sample point such that the elements of the "$s_1$"-dimensional sequence are generated using a random sequence generation methodology.

21. A computer program product as defined in claim 19 in which the first computer-executable instructions comprise instructions executable to enable the computer to generate the "j-th" sample point such that the elements of the "$s_2$"-dimensional sequence are generated using a random sequence generation methodology.

22. A computer program product as defined in claim 19 in which at least part of the selected function represents a shadow ray methodology, in which a plurality of shadow rays comprising simulated traces are traced from a point in the scene towards respective points on the light source, the locations of the points on the light source being determined by $R_j$, the second computer-executable instructions comprising instructions executable to generate the function value in relation to whether respective ones of the shadow rays intersect at least one of said objects in the scene.

23. A computer program product as defined in claim 19 in which at least a part of the selected function represents a distribution path tracing methodology, in which the second computer-executable instructions comprise instructions executable to enable the computer to generate the function value associated with a point in the scene in relation to a plurality of simulated traces projected from the point, the directions of the traces being determined by strata defined on at least a portion of a sphere centered on the point induced by $R_j$.

* * * * *